United States Patent [19]

Maple

[11] 4,132,919

[45] Jan. 2, 1979

[54] ABSORBING INHOMOGENEOUS FILM FOR HIGH CONTRAST DISPLAY DEVICES

[75] Inventor: T. Grant Maple, Sunnyvale, Calif.

[73] Assignee: Lockheed Missiles & Space Company, Inc., Sunnyvale, Calif.

[21] Appl. No.: 859,724

[22] Filed: Dec. 12, 1977

[51] Int. Cl.² .......................... H01J 29/20; H01J 1/62
[52] U.S. Cl. ........................................ 313/466; 96/82; 96/84 M; 250/487; 313/112; 313/474; 350/164; 350/166; 358/252; 427/66; 427/68; 427/70; 428/472; 428/539; 428/913
[58] Field of Search ............... 313/466, 474, 415, 461, 313/463, 110, 112; 358/252; 250/487; 350/164, 166; 351/163; 96/84 M, 82; 427/64, 66, 107, 68-70, 109; 428/913, 472, 539

[56] References Cited

U.S. PATENT DOCUMENTS

| 2,312,206 | 2/1943 | Calbick | 313/474 |
| 2,331,716 | 10/1943 | Nadeau et al. | 350/164 X |
| 2,616,057 | 10/1952 | Coltman | 427/106 X |
| 3,042,542 | 7/1962 | Anders | 428/428 |
| 3,560,784 | 2/1971 | Steele et al. | 313/441 |
| 3,825,436 | 7/1974 | Buchanan et al. | 313/468 |
| 3,936,136 | 2/1976 | Ikeda et al. | 350/164 X |
| 3,946,267 | 3/1976 | Lustig et al. | 313/474 X |
| 3,960,441 | 6/1976 | Kamiya et al. | 350/164 |
| 4,042,390 | 8/1977 | Steele | 427/64 |
| 4,069,355 | 1/1978 | Lubowski et al. | 427/69 X |
| 4,071,640 | 1/1978 | Ignasiak | 427/68 X |

Primary Examiner—Harold Ansher
Attorney, Agent, or Firm—Richard H. Bryer; Billy G. Corber

[57] ABSTRACT

This invention relates to light absorbing inhomogeneous films and their use in luminescent display devices such as cathode ray tubes and electroluminescent panels to achieve high contrast ratio and minimal halation effect, and more particularly to an inhomogeneous film having a composition varying continuously from metal oxide to metal, and the method of making same. The metal is selected from the group consisting of tantalum and vanadium.

15 Claims, 2 Drawing Figures

ABSORBING INHOMOGENEOUS FILM FOR HIGH CONTRAST DISPLAY DEVICES

BACKGROUND OF THE INVENTION

It is well known that ambient illumination, that is light originating from sources external to the display device, is reflected to the observer from various optical interfaces of the device and thus reduces the image contrast by increasing the apparent brightness of the dark image areas. Under conditions of high ambient illumination, the image contrast is severly degraded. In addition, a part of the light emitted by the luminescent material of the device also undergoes undesired reflections, producing a further degradation of contrast and of resolution. When the luminescent material consists of a layer of phosphor material in the form of small powder particles, scattering of the emitted light also occurs, further degrading resolution.

Various means for overcoming these problems have been proposed. These include the use of various filters including polarizing, neutral density and restricted angle or multi-apertured opaque filters. Other methods include the incorporation of a dark material into the glass of the tube face, or a black dye in the phosphor dielectric layer of the display device. All of the methods have the common disadvantage that the emitted light as well as the reflected ambient light intensity is reduced, with the result that the improvement is contrast ratio is less than desired because the emitted light intensity is a factor upon which the contrast ratio depends.

The remarkable reflection-reducing properties of inhomogeneous films were recognized as early as 1880 by Lord Rayleigh (Proc. Lond. Math. Soc. 11, 51, 1880); the properties of such films have been extensively reviewed in a recent series of articles by Jacobsson (Progr. in Optics 5, 247, 1965; Arkiv Fysik 31, 191, 1966; Physics of Thin Films 8, 51, 1975). According to Jacobsson, experimental studies to date have been mainly devoted to transparent inhomogeneous films composed of graded mixtures of two nonabsorbing materials such as $ZnS-Na_3AlF_6$, $ZnS-CeF_3$, $CeO_2-CeF_3$, and $CeO_2-MgF_2$. These films were found to be durable and of good optical quality. A high index mixture of $Ge-ZnS$ has been produced for application in the infrared wavelength region but were found to be relatively soft and sensitive to moisture and inferior to $Ge-MgF_2$ films. $KBr-Au$ films were found to have a very low absorption index, with $k = 0.01$ even at a concentration of gold of 0.16 parts by volume of gold. By contrast, an absorption index of 1.0 was found for a $Ge-Au$ mixture containing 0.1 parts by volume of gold. $Ge-In$ films were also found to have relatively high absorption. Due to the low solubility of In in Ge, the In was expected to remain a separate phase in the form of more or less spherical inclusions.

An inhomogeneous $Ge-Si_xO_y$ film was shown by Jacobsson (1965) and also Olsen and Brown (Res.-/Develop. 16, 52, 1965) to lower the reflectance of a Ge surface to that of a surface of $Si_xO_y$ (refractive index 1.62). Even lower reflectance was obtained with $Ge-MgF_2$ films, although the transmittance was higher than expected (Jacobsson and Martensson, App. Optics, 5, 29, 1966). One of the first applications of inhomogeneous films as an antireflection coating was described by Nadeau and Hilburn in Canadian Pat. No. 418,289 (1944), and U.S. Pat. No. 2,331,716 (Oct. 12, 1944), in which a plastic layer of polystyrene or urea-formaldehyde resin having a high refractive index is diffused into the surface of an article and overcoated with a second plastic of low refractive index such as cellulose caproate or ethylcellulose. An important commercial application of inhomogeneous films as a low reflectance, absorbing coating on sunglasses was described by Anders in U.S. Pat. No. 3,042,542 (German Pat. No. 1,075,808; 1960). The inhomogeneous films described by Anders consisted of a mixture of low refractive index material, $CeF_4$, $ThF_4$, $MgF_2$, or $SiO_2$, and a metal, Ni, Fe, Mn, or Cr, or lower oxide of Nb, Ta, or Ti.

Recently, Steele has proposed in U.S. Pat. No. 3,560,784 the use of a dark dielectric layer consisting of $SiO_2$ with a tapered concentration of codeposited aluminum applied to the rear side of a light transmissive phosphor layer to serve as a light absorbing layer. The tapered concentration of aluminum results in a continuous variation of the index of refraction through the layer, and such layer comprises an optically inhomogeneous film. Steele claimed novelty for a high contrast cathode ray tube utilizing this construction in which the refractive index of the silicon oxide was substantially equal to that of the phosphor. Phospors suitable for use with the inhomogeneous film of Steele were not otherwise identified. The same objective was the object of an earlier patent of Coltman (U.S. Pat. No. 2,616,057) in which the light absorbing layer was described as lampblack or the black deposits produced by evaporating metals such as aluminum or antimony under poor vacuum conditions.

Up to the present, the deposition of tapered inhomogeneous films such as in the Steele patent has required the evaporation of two different materials, with the rate of evaporation of each varied as a function of time. Also, it is usually desired that the initial portion of the deposit consist of one component only with the end portion consisting of the second different material only. Steele shows the initial and end materials to be $SiO_2$ and aluminum, respectively. These requirements pose severe technical difficulties and to achieve reproducible results, elaborate monitoring and control equipment is required so that despite the superior performance offered by inhomogeneous films as compared to homogeneous films, very limited commerical application has been made of inhomogeneous films.

Osterberg (J. Opt. Soc. Am. 48, 513, 1958) has shown that transmitted waves cannot suffer loss of energy by reflection as they traverse nonabsorbing, inhomogeneous media in which the optical properites have no discontinuities. This result is strictly true only when the medium is infinite in extent. For practical applications, film thicknesses used are of the order of the wavelength of light so that interference due to reflection at the boundaries occurs. The width of the reflectance minimum has been found, however, to be greater than can be achieved with homogeneous films. It also has been shown by Osterberg that inhomogeneous absorbing media similarly cannot exhibit reflectance when the optical properties are continuous. In this case, the medium need not be infinite in extent. Anders (Dunne Schichten fur die Optik, Wissenschafftliche Verlagsgesellschaft mbH, Stuttgart, 1965, English translation as Thin Films in Optics, The Focal Press, London, 1967) has observed that a film thickness of only one wavelength is sufficient for essentially complete absorption in an absorbing inhomogeneous film. This property is basic to the dark dielectric layer described by Steele in U.S. Pat. No. 3,560,784 (1971) since the tapered concentration of aluminum results in an absorbing inhomogeneous film. The deposition of such film entails, however, the technical difficulties previously described, including the deposition of two different materials from two sources.

SUMMARY OF THE INVENTION

Briefly, in accordance with the invention, it has been discovered that an inhomogeneous film of a novel tapered composition varying from metal oxide to metal has superior light absorption properties. The metal is selected from the group consisting of tantalum and vanadium. The film is to be prepared by a new method of deposition which has attractive features of simplicity as contrasted with previously known methods for preparing inhomogeneous films, requires only a single source of material, and results in highly reproducible light absorbing properties.

More particularly, the films may be prepared by means of RF or DC reactive sputtering wherein the target is vanadium or tantalum metal and the sputtering atmosphere consists of a mixture of argon and oxygen, with the partial pressure of the oxygen continually varied during deposition of the film in such a manner as to provide the desired inhomogeneity. In one embodiment of the invention, the initial partial pressure of oxygen is selected such that the initial portion of the deposited film consists of transparent, nonabsorbing tantalum oxide. Once deposition has been initiated, the oxygen partial pressure is thereafter gradually reduced until it becomes zero. The effect of gradually reducing the oxygen pressure is to cause the deposited film to become increasingly deficient in oxygen. At sufficiently low or zero pressure the material being deposited is metallic, highly absorbing tantalum or vanadium. A gradient of refractive index is associated with the gradient of oxygen deficiency, or excess metal, in the film. The nature of the gradient is dependent on the rate of decrease of oxygen partial pressure and may be varied continuously to achieve any desired gradient of refractive index. The light absorbing properties of the resulting inhomogeneous films have been found to be not critically dependent upon the rate of decrease of oxygen pressure, equally good results being obtained with either a linear or exponential decrease of pressure as a function of time.

Gerstenberg and Colbick (J. Appl. Phys. 35, 402, 1964) have shown that the x-ray diffraction pattern of films produced by DC reactive sputtering of tantalum in oxygen-argon mixtures at oxygen partial pressures of $9 \times 10^{-5}$ Torr and greater is the same as that of anodic $Ta_2O_5$. A subsequent study by Sneed and Krikorian (J. Appl. Phys. 37, 3674, 1966) showed that the critical oxygen partial pressure for deposition of $Ta_2O_5$ varied between $5 \times 10^{-5}$ and $2 \times 10^{-4}$ Torr depending upon several system and deposition parameters. For the RF sputtering system used to deposit the films of this invention, a critical oxygen partial pressure of $3 \times 10^{-4}$ Torr was observed.

For the purposes of this invention it is not essential that the composition of the initial deposit be stoichiometric $Ta_2O_5$, but rather that it be highly transparent and have a refractive index substantially equal to that of the phosphor layer. The nonreflective film will have its maximum effectiveness when $R_3$ of FIG. 1 is zero. This occurs when the index of refraction of the nonreflective film is equal to the index of refraction of the luminescent film. In the present invention, the metal oxide of the nonreflective film has an index of refraction very close to that of the $La_2O_2S$ luminescent film described in U.S. Pat. No. 3,825,436. Consequently, the reflectivity $R_3$ is very low and the incident light becomes absorbed in the nonreflective film.

Owing to the excess metal incorporated into the films, the films of the invention have appreciable electrical conductivity. This property is particularly desirable where the films are to be used in place of the usual aluminum thin film electrode of typical cathode ray screens since the conductivity of the films prevents charge accumulation associated with incidence of the electron beam on the screen, which would otherwise distort the information to be presented.

It has been found that tantalum and vanadium are uniquely suited as target materials for preparing an inhomogeneous film having the desired properties for use as a nonreflecting layer in light emitting phosphor display devices such as cathode ray tubes. For such devices, it is desirable that the film absorb both the incident ambient light and the light emitted from the back side of the phosphor layer, and in addition prevent light originating at the filament of the electron beam gun from reaching the observer. The film must, therefore, be opaque to all light. Other target materials which have been tried in accordance with the method of the invention include tin, niobium, aluminum, titanium, and molybdenum. The inhomogeneous films thus obtained corresponded to a complete transition between the limits of a clear, transparent oxide film and an opaque metallic film and, with the exception of the aluminum films, were dark when viewed from the oxide side of the film. However, distinct interference colors were noted which can be attributed to internal reflections occurring within the films. According to the Osterberg article, such internal reflection can arise in absorbing inhomogeneous films only at discontinuities of the optical properties within the films. Such discontinuities could arise if there were abrupt changes in the type of oxide being deposited, in contrast with the gradual incorporation of oxygen vacancies and excess metal into a single type of oxide as appears to occur with the tantalum and vanadium systems. Oxides which differ in crystal structure or in valency of the metal component may be expected to have distinctly different indices of refraction. More than one oxide is known to exist in the metal-oxygen systems of tin, niobium, aluminum, titanium, and molybdenum. Although there is evidence for at least one oxide other than $Ta_2O_5$ in the tantalum-oxygen system, diffraction studies by Hollands and Campbell (J. Mater. Sci. 3, 544, 1968) on homogeneous films produced by reactive sputtering of tantalum in argon-oxygen atmospheres at various oxygen content between 0 and 100 percent oxygen indicated that the deposited oxide has the $Ta_2O_5$ structure. Similar studies of the sputtered vanadium oxide structure have not yet been made, but, analagous to the Ta oxide case, the vanadium oxide is probably $V_2O_5$.

Control of the oxygen partial pressure may be conveniently accomplished by means of a micrometer valve placed in the line supplying oxygen to the sputtering system. Variation of the rate of decrease of oxygen pressure may, furthermore, be automated by connecting a variable speed electric motor through a gear chain to the micrometer valve and the voltage actuating the motor programmed in time. Other means of providing a predetermined automatic variation of the oxygen partial pressure are known and may be used. By measurements of the oxygen partial pressure in the system as a function of micrometer setting and measurements of deposition rates at various fixed oxygen pressures, information required for producing a desired gradient of composition is readily obtainable. Such automation will ensure a very high degree of reproducibility of film properties but is not essential as it has been found that very satisfactory nonreflecting films can be produced by a skilled operator through manual operation of the micrometer valve.

BRIEF DESCRIPTION OF THE DRAWING

The invention may be more easily understood from the following description and accompanying drawing in which.

DESCRIPTION OF THE PREFERRED EMBODIMENTS

Figure 1:
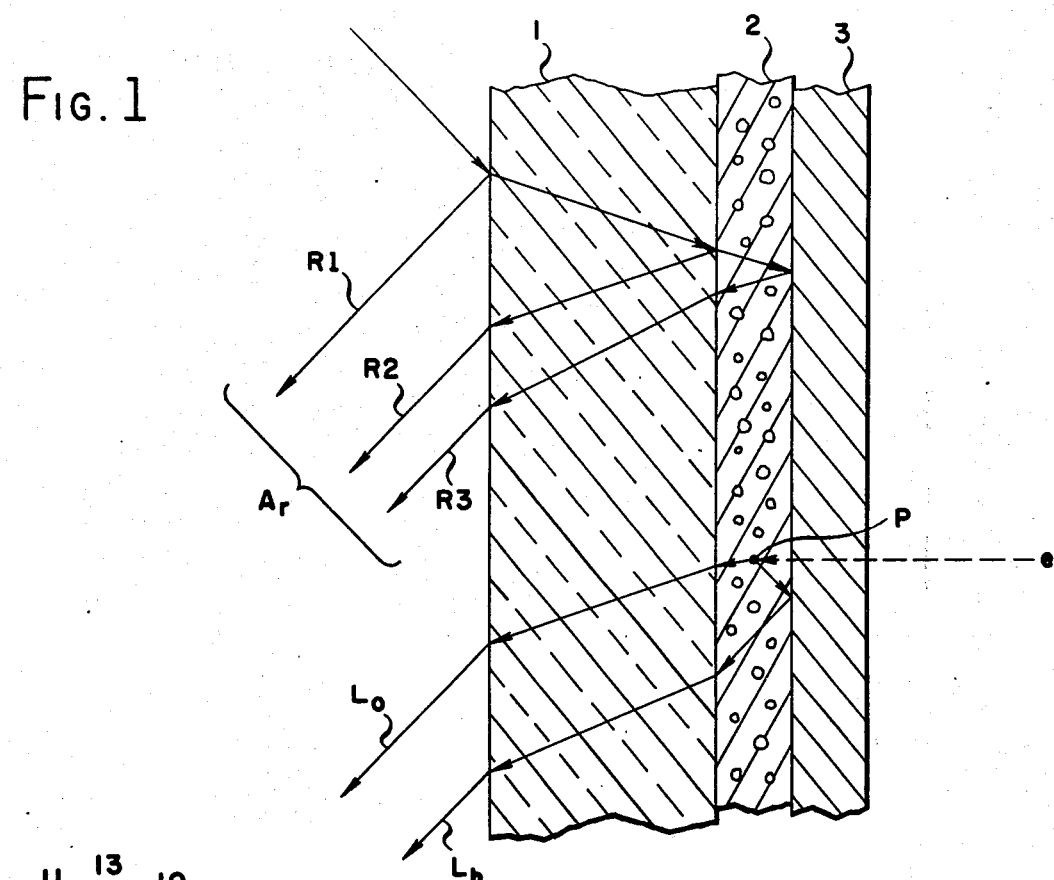
FIG. 1 is a cross-sectional view of a faceplate of a conventional cathode ray tube in which the passage of incident ambient light and light emitted by the phosphor of the cathode ray tube is schematically represented.

Referring more particularly to FIG. 1, there is shown the cross-section of a faceplate of a conventional cathode ray tube in which the passage of incident ambient light and light emitted by the phosphor is schematically represented. Ambient light incident from the left upon the glass face 1 of the cathode ray tube is partially reflected, ray R1, at the air-glass interface; typically, the intensity of R1 is about 4 percent of the incident ambient intensity for a glass having a refractive index of 1.5. Additional reflections R2 and R3 occur at the interfaces between the glass and the phosphor film 2 and between the phosphor film 2 and the aluminum thin film electrode 3, the magnitude of the reflections depending upon the difference in refractive indices of the materials on each side of the interfaces in accordance with the well-known Fresnel equations (see Jenkins and White, Fundamentals of Optics, Third Ed., 1957, p. 510; Born and Wolf, Principles of Optics, Fifth Ed., 1975, p. 40; or Heavens, Optical Properties of Thin Solid Films, 1955, pp. 51–54). For normal incidence, the reflectivity at a boundary between isotropic dielectric media is $$R = \left(\frac{n_o - n_1}{n_o + n_1}\right)^2$$

and at a boundary between a dielectric and a metal $$R = \frac{(n_o - n_1)^2 + k_1^2}{(n_o + n_1)^2 + k_1^2}$$

where $n_1 - ik_1$ is the complex index of refraction of the metal.

The index of refraction of lanthanum oxysulfide is 2.22 at 5440 A° ($La_2O_2S$:Tb green emission; see Sobon et al., J. Appl. Phys. 42, 3049, 1971), and for an aluminum film $n = 0.82$ and $k = 5.99$ (Drummeter and Haas, Physics of Thin Film 2, 339, [1964]). The reflectivity at an $La_2O_2S$ — Al boundary is thus 83.8 percent. By contrast, the reflectivity for an $La_2O_2S$ — $Ta_2O_5$ boundary is calculated as 0.29 percent, using a value of 2.12 for the index of tantalum oxide films deposited by electron beam bombardment as determined by Yeh et al. (J. Appl. Phys. 47, 4107, 1976). A portion of the reflected rays R2 and R3 may undergo additional reflections, not depicted in the drawing, at the air-glass and glass-phosphor interfaces. Also depicted in FIG. 1 is the emission of light at a point P in the phosphor 2 produced by absorption of electrons projected from an electron gun, not shown, situated to the right of the drawing. A portion of the light, $L_0$, is emitted toward the observer at the left and a portion toward the aluminum electrode 3; the latter portion of emitted light undergoes reflection at the phosphor-aluminum interface. A portion of the light emitted toward the observer may be reflected at the phosphor-glass interface and a further portion reflected at the glass-air interface. That light which is emitted oblique to the plane of the phosphor is displaced laterally with respect to the normal axis through point P during transit through the faceplate, in accordance with Snell's law, $n_0 \sin \theta_0 = n_1 \sin \theta_1$, where $\theta_0$ and $\theta_1$ are the angles of incidence and refraction, respectively (Jenkins and White, loc. cit. p. 5). Reflections result in the halation, $L_h$, depicted in the figure.

As the result of successive reflections, a large proportion of the ambient light $A_r$ may be reflected toward the observer and will affect the degree to which the emitted light is visible to the observer. The visibility is expressed as the contrast ratio C, where $$C = \frac{A_r + L_o}{A_r},$$

$A_r$ is the intensity of reflected ambient light and $L_0$ is the emitted light viewed by the observer. Since under high ambient illumination intensity $A_r$ may greatly exceed $L_0$, it is evident that a very low contrast ratio can occur. It is clear that the contrast ratio can be increased only by reducing the intensity of reflected ambient light $A_r$.

For the interface between glass of index 1.5 and a lanthanum oxysulfide phosphor of index 2.22, the reflectivity is 3.75 percent. Both this value and that for the air-glass interface are very small compared to that of the phosphor-aluminum interface. The intensity of ambient light reflected to the observer is therefore predominantly due to reflection at the phosphor-aluminum interface, and thus the most effective means of improving the contrast ratio is to reduce the reflectivity at this interface. As will be evident from the examples of this invention, this objective is attained by replacing the aluminum with the inhomogeneous film of the invention.

Calculations according to the Fresnel equations indicate that when the refractive index of that part of the inhomogeneous film at the interface with lanthanum oxysulfide has a value between 1.82 and 2.71, the interfacial reflectivity will be less than 1 percent; and, for a value between 1.93 and 2.55, less than 0.5 percent. For a phosphor of index $n_p$, the inhomogeneous film index $n_i$ corresponding to 1 percent reflectivity is $n_i = 0.82 \, n_p$ to $1.22 \, n_p$, and for 0.5 percent reflectivity, $0.87 \, n_p$ to $1.15 \, n_p$.

It is thus evident that the interfacial reflectivity can be reduced to a negligible amount, with a most substantial improvement of contrast, without the necessity of the exact match of refractive indices corresponding to zero reflectivity; such exact match is difficult to attain in practice.

Using the value 2.10 for the index of the tantalum oxide component of the inhomogeneous film of the invention, it can be calculated that the interfacial reflectivity is less than 1 percent for a phosphor having an index between 1.72 and 2.56, or less than 0.5 percent for an index between 1.82 and 2.29, thus indicating that the films of the invention are also suitable for use with phosphors other than lanthanum oxysulfide.

Figure 2:
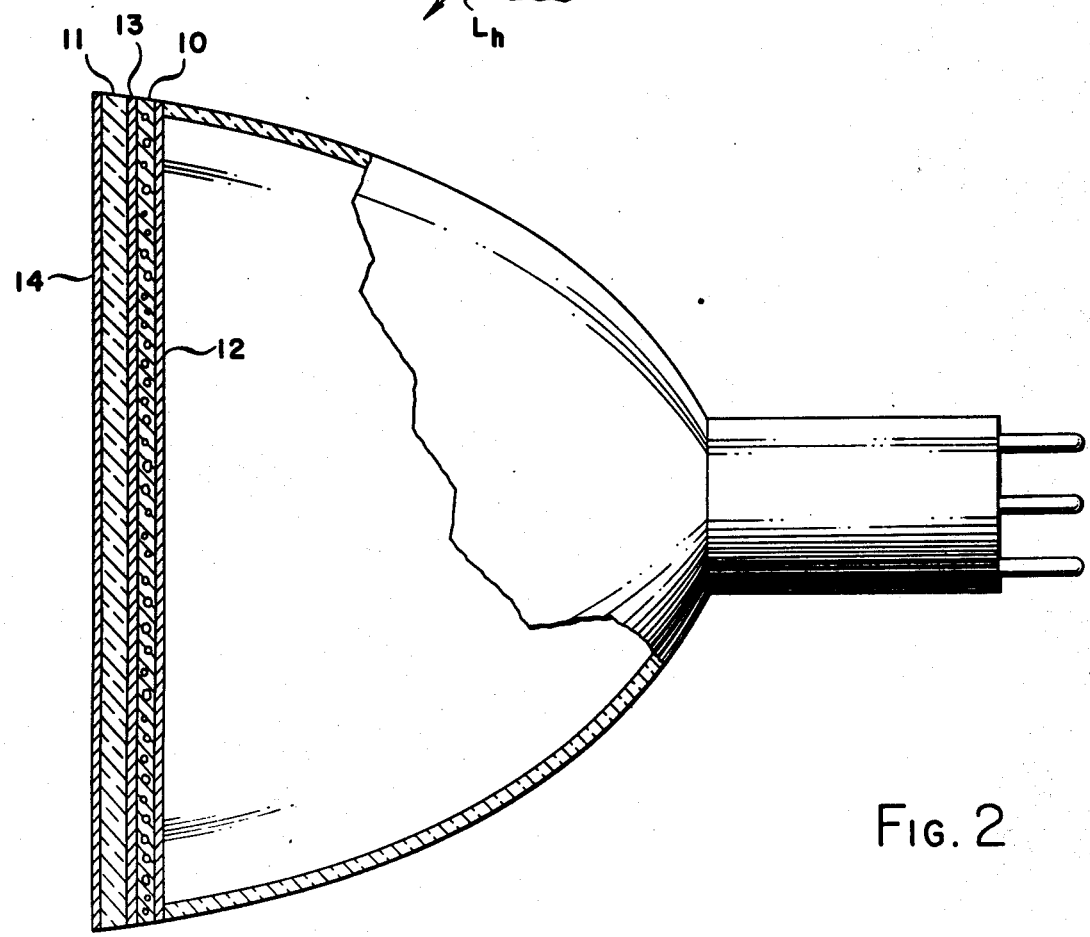
FIG. 2 is a cross-sectional view of the faceplate of a cathode ray tube constructed in accordance with the invention.

In FIG. 2, there is shown a cross-section of the faceplate of a cathode ray tube construced according to the present invention. A cathodoluminescent phosphor material 10 is deposited on the glass faceplate 11. A metal oxide-metal absorbing inhomogeneous film 12, where the metal is tantalum or vanadium, is deposited on the back side of the phosphor material 10 by the method of the present invention, described more fully hereinafter. A preferred phosphor material for the luminescent display devices of the invention is described in U.S. Pat. No. 3,825,436. This phosphor has the formula $Ln_2O_2S:RE$, where $Ln$ is at least one trivalent rare earth host ion selected from the group consisting of lanthanum, gadolinium, yttrium and lutetium and RE is at least one trivalent activator ion selected from the group consisting of rare earth ions having atomic numbers 59 through 70 and in which from about 0.001 percent to 20 percent of the trivalent host ions have been replaced by at least one said activator ion. However, other continuous crystalline phosphor films deposited by conventional vacuum deposition methods, such as described in U.S. Pat. No. 3,347,693, or deposited by the method of U.S. Pat. No. 3,108,904 are suitable. Irrespective of the phosphor material employed, it is important that it be deposited as an essentially smooth and continuous transparent film without significant surface texture, thereby avoiding the scattering of light inherent to the use of a powder phosphor layer. Rather than a single phosphor film, the phosphor material 10 may consist of multiple films, each film capable of emitting a different color; see U.S. Pat. No. 3,825,436.

In order to avoid unwanted reflections at the interface between the glass 11 and the phosphor 10 which may arise by reason of a mismatch of the respective refractive indices, a quarter-wave homogeneous film 13 of a suitable material, having refractive index $n_b$ satisfying the Strong relation $n_b = \sqrt{n_a n_c}$, where $n_a$ is the refractive index of the glass and $n_c$ is the refractive index of the phosphor, is optionally deposited on the glass plate 11 prior to deposition of the phosphor film 10. The interface reflectivity will thereby be reduced to zero at the given wavelength, but appreciable reflectivity may occur at other wavelengths. A broader minimum with respect to wavelength can be achieved by alternatively depositing a nonabsorbing inhomogeneous film in place of the homogeneous film. Additionally, an antireflection coating 14 of conventional type may also be optionally applied to the exterior of the glass plate 11 to eliminate reflection that would otherwise occur at the air-glass interface.

It will be understood that the optional antireflection coating 14 and optional homogeneous film 13 or the alternative optional nonabsorbing inhomogeneous film 13 are not essential for obtaining good contrast in most applications for which the ambient illumination is moderate, but may be desirable under extremely high ambient illumination intensity, such as that provided in direct sunlight.

The absorbing inhomogeneous films of the invention comprise at the phosphor-film interface a metal oxide having a refractive index closely matching that of the phosphor and at the opposite metal side an index approximately that of the bulk metal. Illustratively, an absorbing inhomogeneous tantalum oxide-tantalum film is readily made according to the invention with a refractive index of approximately 2.1 at its interface with the phosphor, thus providing a close match to the refractive index of lanthanum oxysulfide which has been determined to have an index of approximately 2.2, and is therefore particularly suited for use with the inhomogeneous film of this invention and is also one of the brightest of known phosphors. The refractive index at the tantalum side of the inhomogeneous film has a refractive index approximating that of a bulk tantalum which is known to have the complex index 2.53–2.76i.

An absorbing inhomogeneous vanadium oxdide-vanadium film is also readily made according to the invention and as will be evident from the example, provides nearly as close match to the refractive index of lanthanum oxysulfide as is obtained with the tantalum oxide-tantalum film. As it is known that an inverse relationship exists between electron range and the periodic number and density of the components of a film (see Feldman, Phys. Rev. 117, 455, 1960), the vanadium-based film of the invention has particular advantages when it is desired to operate a cathode ray tube or luminescent display device at lower anode voltages.

In another embodiment of this invention, the tantalum oxide-tantalum absorbing inhomogeneous film disclosed herein may be advantageously substituted for the special dark dielectric layer of the luminescent panels described in U.S. Pat. No. 3,560,784. The relative simplicity of the method of preparing the films described herein and greater reproducibility of properties of the films prepared by the method of this invention are made evident in Example 1 hereof and the films of this invention may be more economically prepared by reason of the less technically complex equipment required to produce the films than those of U.S. Pat. No. 3,560,784.

It will be readily understood that thin films of inert materials such as silicon oxide may be deposited on the phosphor film prior to deposition of the absorbing inhomogeneous film to serve as a barrier against any possible reaction between the phosphor and the inhomogeneous film that may, for example, be promoted by localized heating due to electron bombardment at high electron beam densities. Where appropriate for matching refractive indices of the adjoining materials, the barrier film may advantageously consist of a mixture, such as silicon oxide and aluminum oxide.

In the examples which follow, a detailed description of the novel method of preparing the absorbing inhomogeneous films of the invention is provided. A conventional RF sputtering system was used for preparing the films of the examples. Equally satisfactory results may also, however, be obtained by use of DC sputtering. As is well known to those skilled in the art of sputtering, the sputtering atmosphere pressure employed for RF sputtering, typically 1 to 5 microns, differs appreciably from that employed for DC sputtering, typically 50 to 100 microns. It is, therefore, to be expected that somewhat different oxygen pressures may be required when DC sputtering to attain results equivalent to those of RF sputtering. It is also known that deposition rates may vary between sputtering systems of different manufacture. RF systems which employ added DC bias or crossed electrical and magnetic fields have characteristically high deposition rates. Appropriate allowance must therefore be made for the particular system used. A preliminary calibration of the desired system for deposition rates and film characteristics at various fixed oxygen partial pressures, at a given input power level, will readily establish the conditions for preparing an inhomogeneous film having the desired refractive index gradient and thickness.

The absorbing, inhomogeneous films of the invention may also be prepared by the conventional two-source evaporation method, utilizing a metal oxide as one source and the metal component of the oxide as the second source. The preferred method, by reason of greater convenience and the high reproducibility attainable, is, however, the use of RF sputtering.

EXAMPLE 1

The sputtering system used was a conventional RF system with liquid nitrogen trap and water-cooled substrate support; DC bias or magnetic field were not utilized. The target was a 5-inch diameter tantalum metal disc and the source to substrate distance was 5 cm. A shutter was interposed between target and substrate during the presputter clean-up period. The system was initially evacuated by a diffusion pump to a pressure of less than $1 \times 10^{-6}$ Torr, following which the high vacuum valve was partially closed to act as throttle between the sputtering chamber and the diffusion pump. This permitted the diffusion pump to operate within an efficient low pressure range while the higher pressure required for sputtering could be maintained within the sputtering chamber through the continuous admission of the sputtering gases. Th sputtering atmosphere consisted of a mixture of argon and oxygen, with argon being the dominant component. After partially closing the high vacuum valve, a flow of oxygen was established, the flow being regulated by a micrometer valve to obtain the desired pressure in the sputtering chamber as determined by means of an ionization gauge. The flow of argon was next established and adjusted with a second micrometer valve to provide a total pressure of 5 microns. As the sputtering atmosphere consisted predominantly of argon at all times, no further adjustment of the argon micrometer valve was necessary. The sputtering discharge was then initiated at 400 watts input RF power, and the reflected RF power reduced to a negligible amount by tuning of an impedance matching network. Sputtering was continued for 45 minutes with the shutter in place to prevent deposit on the substrate. This insured removal of undesired possible contaminants absorbed on the target or chamber walls. At the end of this presputtering period, the shutter was opened to allow deposition on the substrate. Deposition was terminated at the desired time by switching off the RF supply.

A preliminary series of depositions using microscope slides as substrates was made at various fixed oxygen pressures. The films obtained were accordingly homogeneous films. Deposition times were 15 minutes; film thicknesses were measured by multiple-beam interferometry. The results are summarized in Table I.

Table I

| | Films Prepared at Fixed Oxygen Pressures | | | |
|---|---|---|---|---|
| Sample | $O_2$ Pressure Torr | Thickness A° | Deposition Rate A°/min. | Appearance |
| 1 | $5.0 \times 10^{-4}$ | 1112 | 74 | Clear, pale red |

Table I-continued

| | Films Prepared at Fixed Oxygen Pressures | | | |
|---|---|---|---|---|
| Sample | $O_2$ Pressure Torr | Thickness A° | Deposition Rate A°/min. | Appearance |
| 2 | $4.0 \times 10^{-4}$ | 1432 | 96 | Clear, pale red |
| 3 | $3.0 \times 10^{-4}$ | 1538 | 104 | Clear, pale pink |
| 4 | $2.0 \times 10^{-4}$ | 1818 | 121 | Clear, pale green |
| 5 | $1.75 \times 10^{-4}$ | 2354 | 157 | Light Brown |
| 6 | $1.6 \times 10^{-4}$ | 2629 | 175 | Dark Brown |
| 7 | $1.5 \times 10^{-4}$ | 2641 | 176 | Very Dark |
| 8 | $1.5 \times 10^{-4}$ | 2652 | 177 | Black |
| 9 | $1.4 \times 10^{-4}$ | 2487 | 166 | Black, metallic |
| 10 | $1.25 \times 10^{-4}$ | 2318 | 155 | Black, metallic |
| 11 | $1.0 \times 10^{-4}$ | 1939 | 129 | Metallic, dark |
| 12 | $5.0 \times 10^{-5}$ | 1449 | 97 | Metallic, dark |
| 13 | 0 | 1567 | 105 | Metallic, dark |

Target - Tantalum

This shows that by changing the oxygen pressure in the sputtering chamber the deposited film is changed from the clear metal-oxide form to the opaque metal form.

The absorbing inhomogeneous films of the example were prepared in the same manner, except that sapphire substrates provided with a $La_2O_2S$:Tb or $La_2O_2S$:Eu phosphor film of 1 micron thickness previously deposited by the RF sputtering method of U.S. Pat. No. 3,825,436 were used an the oxygen partial pressure was gradually reduced during the deposition period by adjustment of a micrometer valve according to the schedule of Table II, chosen to produce an approximately exponential rate of pressure decrease and a reasonably linear rate of film thickness increase.

Table II

| Inhomogeneous Film Schedule | |
|---|---|
| Time min. | $O_2$ Pressure Torr |
| 0 | $3.4 \times 10^{-4}$ |
| 1 | $2.6 \times 10^{-4}$ |
| 2 | $1.75 \times 10^{-4}$ |
| 3 | $1.8 \times 10^{-4}$ |
| 4 | $1.7 \times 10^{-4}$ |
| 5 | $1.6 \times 10^{-4}$ |
| 6 | $1.5 \times 10^{-4}$ |
| 7 | $1.3 \times 10^{-4}$ |
| 8 | $1.13 \times 10^{-4}$ |
| 9 | $1.0 \times 10^{-4}$ |
| 10 | $9.3 \times 10^{-5}$ |
| 11 | $8.6 \times 10^{-5}$ |
| 12 | $6.6 \times 10^{-5}$ |
| 13 | $5.0 \times 10^{-5}$ |
| 14 | 0 |
| 15 | End of Run |

The reflectivity of several absorbing inhomogeneous tantalum oxide-tantalum films prepared according to the method of the method of the example were measured with a Spectra Spot Brightness Meter, Model UB-1/2, using a diffuse white light source to illuminate the samples. The reflectivity of an uncoated sapphire substrate was also measured. From these measurements and the known refractive indices of sapphire and $La_2O_2S$, 1.76 and 2.14, respectively, the reflectivity of the phosphor-absorbing film interface was determined by calculation using Snell's laws as referenced above.

The results are presented in Table III, together with results for similarly prepared substrates having a commercially deposited silicon monoxide-tapered aluminum coating.

The exceptionally low reflectivity and high reproducibility of the $Ta_2O_5$-Ta films of the invention as compared with commercial SiO—Al films is clearly evident from Table III.

It is to be emphasized that the particular schedule of the example was chosen for convenience only and is not essential for preparing light absorbing films for use in cathode ray tubes and luminescent panels. Tantalum oxide-tantalum films with similarly low reflectivities have been prepared according to other oxygen partial pressure schedules. It is only essential that the variation of refractive index be reasonably continuous and the films have sufficient thickness to be essentially opaque.

Table III

| Reflection at Phosphor-Absorbing Film Interface | | |
|---|---|---|
| Sample | | Reflectivity % |
| Commercial SiO-Al No. | 1 | 6.5 |
| " | 2 | 5.1 |
| " | 3 | 4.5 |
| " | 4 | 2.8 |
| " | 5 | 1.8 |
| " | 6 | 13.6 |
| " | 7 | 9.2 |
| " | 8 | 15.0 |
| " | 9 | 2.2 |
| " | 10 | 7.9 |
| Experimental $Ta_2O_5$-Ta No. | 1 | 0.0 |
| " | 2 | 0.4 |
| " | 3 | 0.0 |

EXAMPLE 2

Films were prepared as in Example 1, but substituting a vanadium metal target for the tantalum target.

A preliminary series of 15-minute depositions of homogeneous films gave the results summarized in Table IV.

Table IV

| Films Prepared at Fixed Oxygen Pressures | | | | |
|---|---|---|---|---|
| Sample | $O_2$ Pressure Torr | Thickness Å | Deposition Rate Å/min. | Appearance |
| 1 | $5.0 \times 10^{-4}$ | 696 | 45 | Clear, pale yellow |
| 2 | $4.0 \times 10^{-4}$ | 998 | 67 | Clear, yellow |
| 3 | $3.0 \times 10^{-4}$ | 772 | 52 | Clear, yellow |
| 4 | $2.0 \times 10^{-4}$ | 1111 | 74 | Clear, yellow-green |
| 5 | $1.8 \times 10^{-4}$ | 1788 | 119 | Brown |
| 6 | $1.7 \times 10^{-4}$ | 4462 | 297 | Metallic, dark |
| 7 | $1.5 \times 10^{-4}$ | 5224 | 348 | Metallic, dark |
| 8 | $1.0 \times 10^{-4}$ | 2551 | 170 | Metallic |
| 9 | 0 | 2946 | 190 | Metallic |

The inhomogeneous films of the example were also prepared as in the preceding example but following the schedule of Table V.

Table V

| Inhomogeneous Film Schedule | |
|---|---|
| Time min. | $O_2$ Pressure Torr |
| 0 | $3.15 \times 10^{-4}$ |
| 1 | $1.45 \times 10^{-4}$ |
| 3 | $9.3 \times 10^{-5}$ |
| 4 | $8.0 \times 10^{-5}$ |
| 5 | $7.4 \times 10^{-5}$ |
| 6 | $6.4 \times 10^{-5}$ |
| 7 | $5.95 \times 10^{-5}$ |
| 8 | $5.55 \times 10^{-5}$ |
| 9 | $5.2 \times 10^{-5}$ |
| 10 | $5.0 \times 10^{-5}$ |
| 11 | $4.76 \times 10^{-5}$ |
| 12 | $4.6 \times 10^{-5}$ |
| 13 | 0 |
| 14 | 0 |
| 15 | 0 |
| 16 | End of Run |

The reflectivity of several absorbing inhomogeneous films prepared according to the method of the example were measured in Example 1, and the reflectivity of the phosphor-absorbing film interface determined using Snell's laws. The results are presented in Table VI.

Table VI

| Reflection at Phosphor-Absorbing Film Interface | | |
|---|---|---|
| Sample | | Reflectivity % |
| Experimental $V_2O_5$-V No. | 1 | 1.5 |
| " | 2 | 0.4 |
| " | 3 | 0.1 |

What is claimed is:

1. A viewing screen for a luminescent display device comprising a transparent viewing portion, a luminescent phosphor layer on the interior surface of said viewing portion and a light absorbing inhomogeneous film covering and adherent to said phosphor layer, said film having a tapered composition varying continuously from a metal oxide at a point remote from said interface at the phosphor-film interface to the metal constituent of said oxide such that said film exhibits a continuous gradient of refractive index from an index approximating the index of said phosphor at the phosphor-film interface to an index approximating the index of said metal at said remote point, and said metal oxide being selected from the group of oxides consisting of tantalum oxide and vanadium oxide.

2. A viewing screen in accordance with claim 1 wherein said phosphor has the formula $Ln_2O_2S$:RE, where Ln is at least one trivalent rare earth host ion selected from the group consisting of lanthanum, gadolinium, yttrium and lutetium and RE is at least one trivalent activator ion selected from the group consisting of rare earth ions having atomic numbers 59 through 70 and in which from about 0.001 percent to 20 percent of the trivalent host ions have been replaced by at least one said activator ion.

3. A viewing screen in accordance with claim 2 wherein Ln is lanthanum.

4. A viewing screen in accordance with claim 1 wherein said display device is a cathode ray tube.

5. A viewing screen in accordance with claim 1 wherein said phosphor layer consists of multiple phosphor films, each film capable of luminescing at a different color.

6. A luminescent display device comprising a transparent viewing portion, a phosphor layer on the interior surface of said viewing portion, a light absorbing inhomogeneous film covering and adherent to said phosphor layer and excitation means for causing said phosphor layer to luminesce, said inhomogeneous film having a tapered composition varying continuously from a metal oxide at the phosphor-film interface to the metal constituent of said oxide facing said excitation means such that said film exhibits a continuous gradient of refractive index from an index approximating the index of said phosphor at the phosphor-film interface to an index approximating the index of said metal, and said metal oxide being selected from the group of oxides consisting of tantalum oxide and vanadium oxide.

7. A display device in accordance with claim 6 wherein said device is a cathode ray tube.

8. A display device in accordance with claim 6 said phosphor has the formula $Ln_2O_2S$:RE, where Ln is at least one trivalent rare earth host ion selected from the group consisting of lanthanum, gadolinium, yttrium and lutetium and RE is at least one trivalent activator ion selected from the group consisting of rare earth ions having atomic numbers 59 through 70 and in which from about 0.001 percent to 20 percent of the trivalent host ions have been replaced by at least one said activator ion.

9. A display device in accordance with claim 8 wherein Ln is lanthanum.

10. A display device in accordance with claim 6 wherein said phosphor layer consists of multiple phosphor films, each film capable of luminescing at a different color.

11. A method for making a viewing screen for luminescent display devices consisting essentially of the steps of:
forming a luminescent phosphor layer on a transparent substrate, and
forming a light absorbing inhomogeneous film on said phosphor substrate, said film having a tapered composition varying continuously from a metal oxide at the phosphor-film interface to the metal constituent of said oxide at a point remote from said interface such that said film exhibits a continuous gradient of refractive index from an index approximating the index of said phosphor at the phosphor-film interface to an index approximating the index of said metal at said remote point and said metal oxide being selected from the group of oxides consisting of tantalum oxide and vanadium oxide.

12. A method in accordance with claim 11 wherein said phosphor has the formula $Ln_2O_2S:RE$, where Ln is at least one trivalent rare earth host ion selected from the group consisting of lanthanum, gadolinium, yttrium and lutetium and RE is at least one trivalent activator ion selected from the group consisting of rare earth ions having atomic numbers 59 through 70 and in which from about 0.001 percent to 20 percent of the trivalent host ions have been replaced by at least one said activator ion.

13. A method in accordance with claim 12 wherein Ln is lanthanum.

14. A method in accordance with claim 11 wherein said display device is a cathode ray tube.

15. A method in accordance with claim 11 wherein said phosphor layer consists of multiple phosphor films, each film capable of luminescing at a different color.

* * * * *